(12) United States Patent
Beno et al.

(10) Patent No.: US 7,959,163 B2
(45) Date of Patent: Jun. 14, 2011

(54) SUSPENSION-RELATED SYSTEMS AND METHODS

(75) Inventors: Joseph Beno, Austin, TX (US); Don Bresie, Round Rock, TX (US); Joseph Strubhar, Austin, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 257 days.

(21) Appl. No.: 11/368,317

(22) Filed: Mar. 3, 2006

(65) Prior Publication Data

US 2010/0230922 A1 Sep. 16, 2010

Related U.S. Application Data

(60) Provisional application No. 60/658,783, filed on Mar. 4, 2005.

(51) Int. Cl.
*B60G 17/015* (2006.01)
(52) U.S. Cl. .................................. 280/5.5; 280/124.129
(58) Field of Classification Search .................... 280/5.5, 280/5.514, 6.157, 124.129, 705; 180/9.1, 180/36.08; 701/37
See application file for complete search history.

(56) References Cited

U.S. PATENT DOCUMENTS

| | | | | |
|---|---|---|---|---|
| 3,459,439 A | * | 8/1969 | Otto et al. .................. | 280/6.157 |
| 4,156,536 A | | 5/1979 | Brandstadter ................. | 280/705 |
| 4,721,328 A | * | 1/1988 | Chauveau et al. ..... | 280/124.129 |
| 5,324,065 A | * | 6/1994 | Derrien et al. ......... | 280/124.129 |
| 5,999,868 A | | 12/1999 | Beno et al. ...................... | 701/37 |
| 7,273,117 B2 | * | 9/2007 | Pond .......................... | 180/24.02 |
| 2002/0113395 A1 | * | 8/2002 | Eriksson et al. ....... | 280/124.129 |
| 2003/0122328 A1 | * | 7/2003 | Lin et al. .................... | 280/5.508 |
| 2004/0232632 A1 | * | 11/2004 | Beck et al. ..................... | 280/5.5 |
| 2006/0293814 A1 | * | 12/2006 | Schweichkardt et al. ...... | 701/37 |

OTHER PUBLICATIONS

"The Car Suspension Bible: The Suspension Bible," www.chrislonghurst.com/carbibles/suspension_bible.html, 25 pages printed on Mar. 3, 2005.

* cited by examiner

*Primary Examiner* — Eric Culbreth
*Assistant Examiner* — Karen A Beck
(74) *Attorney, Agent, or Firm* — Fulbright & Jaworski L.L.P.

(57) ABSTRACT

In some embodiments, the present systems include, consist of, or consist essentially of a roadarm having a first end, a second end, and an opening near the first end; where the second end is configured for attachment to a passive spring (e.g., an air spring, a coil spring, a compressible fluid spring, or a leaf spring), and the opening is configured for interchangeable use with any of: (a) a passive suspension system damping element, (b) a semi-active suspension system damping element, and (c) an active suspension system actuator. Other systems are included, such as those with common control systems for the active and semi-active suspension systems. Methods relating to such systems.

18 Claims, 16 Drawing Sheets

SUSPENSION-RELATED SYSTEMS AND METHODS

CROSS-REFERENCE(S) TO RELATED APPLICATION(S)

This application claims priority to U.S. Provisional Patent Application Ser. No. 60/658,783, filed Mar. 4, 2005, the entire contents of which are expressly incorporated by reference.

BACKGROUND

1. Field

The present invention relates to vehicle suspension systems.

2. Description of Related Art

Military vehicles benefit from very high levels of platform stability and increased cross-country speed, which requires advanced suspension systems to adequately isolate the vehicle body, payload and crew from terrain irregularities. Furthermore, modern armies increasingly base their combat organizations and tactics around families of vehicles that maximize common subsystems but are configured for specialized payloads or missions such as direct fire anti-tank weapons, anti-aircraft weapons, indirect fire mortars and artillery, ammunition transport, combat re-supply transport, infantry transport, and battlefield command and control. The purpose of using families of similar vehicles for divergent missions is to dramatically reduce research, development and acquisition costs.

However, it is recognized that cross-country mobility, speed, and chassis stability needs for the various mission specific payloads can be very different and the cost and criticality of the various payloads can also be very different. Consequently, acceptable costs for suspension system solutions to provide platform/payload stability also varies considerably.

SUMMARY

Some of the present systems comprise a vehicle (e.g., a tracked vehicle) that includes at least two different suspension systems (e.g., 2 or 3) at different wheel stations of the vehicle, the suspensions systems being either a passive suspension system, a semi-active suspension system, and an active suspension system (stated another way, the suspension systems being chosen from the group consisting of a passive suspension system, a semi-active suspension system, and an active suspension system). Thus, and for example, if a given vehicle has 4 wheel stations per side, one of those wheel stations may have a passive suspension system, two may have a semi-active suspension system, and one may have an active suspension system. Some embodiments of the present methods comprise providing such a vehicle (i.e., a vehicle having two or more different suspension systems at different wheel stations).

Some embodiments of the present systems and methods are directed generally to providing a range of suspension options within a common space envelope. Some embodiments of the present systems and methods are directed to maximizing the commonality of components among various suspension options. While this disclosure has tracked vehicles as its focus, embodiments of the present systems and methods may also be applied to wheeled vehicles. With wheeled vehicles, the passive spring discussed below may be, for example, a leaf spring.

In some embodiments, the present systems include, consist of, or consist essentially of a roadarm having a first end, a second end, and an opening near the first end; where the second end is configured for attachment to a passive spring (e.g., an air spring, a coil spring, a compressible fluid spring, or a leaf spring), and the opening is configured for interchangeable use with any of: (a) a passive suspension system damping element, (b) a semi-active suspension system damping element, and (c) an active suspension system actuator. A roadarm having an opening configured in this way is a roadarm that can be used on an operating vehicle with any of the three recited elements without altering the roadarm material that defines the opening (e.g., by routing out a bigger opening). Thus, and for example, a passive damping element in such a system may be switched out with a semi-active damping element without changing the size of the roadarm opening.

In some embodiments, the systems include, consist of, or consist essentially of a collar that fits within the opening, the collar being attachable to, or an integral part of, a vehicle hull. An example of a collar that is attachable to a vehicle hull is a collar that is part of a baseplate that is attachable to a vehicle hull. In some embodiments, the systems also include, consist of, or consist essentially of a passive suspension system damping element contained at least partially within the opening; a semi-active suspension system damping element contained at least partially within the opening; or an active suspension system actuator contained at least partially within the opening. In some embodiments, the roadarm includes a protrusion configured to contact a bumpstop when the roadarm over-rotates. In some embodiments, the systems also include, consist of, or consist essentially of a bumpstop configured to contact the protrusion when the roadarm over-rotates (such as a bumpstop that is attached to a baseplate that is attachable to a vehicle hull, or a bumpstop that is part of or directly attached to a vehicle hull). In some embodiments, the systems also include, consist of, or consist essentially of a control system configured to control (at different times) both a semi-active suspension system damping element, and an active suspension system actuator.

In some embodiments, the present systems include, consist of, or consist essentially of a roadarm having an opening (such as an opening near one of its ends); a collar that fits within the opening; and a passive spring attached to the roadarm; the opening and collar being configured such that, without modifying either of them, the system will operate at different times with any of: (a) a passive suspension system damping element, (b) a semi-active suspension system damping element, and (c) an active suspension system actuator. A system having a roadarm opening and a collar that are configured as just described is a system that can be used on an operating vehicle with any of the three recited items without modifying the size of the roadarm opening or the size of the collar. Thus, and for example, a passive suspension system damping element in such a system may be switched out with a semi-active suspension damping element without changing the size of the roadarm opening or the size of the collar.

In some embodiments, the collar is attachable to a vehicle hull, such as a collar that is part of a baseplate that is attachable to a vehicle hull. In some embodiments, the collar is an integral part of a vehicle hull. In some embodiments, the systems further include, consist of, or consist essentially of a passive suspension system damping element surrounded, at least in part, by the collar (and, thus, also by the opening); a semi-active suspension system damping element surrounded, at least in part, by the collar; or an active suspension system actuator surrounded, at least in part, by the collar. In some embodiments, the roadarm includes a protrusion configured to contact a bumpstop when the roadarm over-rotates. In some embodiments, the systems also include, consist of, or consist essentially of a bumpstop configured to contact the protrusion when the roadarm over-rotates (such as a bumpstop that is attached to a baseplate that is attachable to a vehicle hull, or a bumpstop that is part of or directly attached to a vehicle hull). In some embodiments, the systems also include, consist of, or consist essentially of a control system configured to control (at different times) both a semi-active suspension system damping element, and an active suspension system actuator.

In some embodiments, the present systems include, consist of, or consist essentially of a roadarm having an opening configured for interchangeable use with any of: (a) a passive suspension system rotary damping element, (b) a semi-active suspension system rotary damping element, and (c) an active suspension system rotary actuator; and a control system configured to control (a) a semi-active suspension system rotary damping element when the semi-active suspension system rotary damping element, and (b) an active suspension system rotary actuator when the active suspension system rotary actuator is used. In some embodiments, the systems also include, consist of, or consist essentially of a passive spring attached to the roadarm.

Some embodiments of the present systems include control systems that are configured to control (e.g., operate) an active or semi-active suspension system such that if the control system detects that a motor force is desired or otherwise required by one or more of the sensors of the actuator in question, the command sent to the semi-active actuator in such a situation is zero, whereas the comparable command sent to the active actuator in the same situation is non-zero. Some of the present methods include providing such a control system, and delivering such commands in response to receiving one or more signals indicated the desired/required motor force condition.

In some embodiments, the present methods comprise, consist of, or consist essentially of creating a common space envelope at each wheel station of a vehicle within which any of the following will fit and can be used during operation of the vehicle: a passive suspension system, a semi-active suspension system, and an active suspension system.

In some embodiments, the methods also include, consist of, or consist essentially of filling the common space envelope at one or more of the wheel stations with a passive suspension system, a semi-active suspension system, or an active suspension system depending on one or more mission payload considerations. In some embodiments, the creating allows the passive, semi-active, or active suspension system at a given wheel station to be replaced with a different suspension system that fits within the common space envelope after one or more mission payload considerations change. In some embodiments, the methods also include, consist of, or consist essentially of providing a common control system configured to control (a) an actuator of the semi-active suspension system when the semi-active suspension system is used, and (b) an actuator of the active suspension system when the active suspension system is used.

In some embodiments, the present methods comprise, consist of, or consist essentially of operating a vehicle with a roadarm that includes a passive rotary damper element; and replacing the passive rotary damper element with either a semi-active rotary damper element or an active rotary damper element after one or more mission payload considerations change, the replacing occurring without replacing the roadarm.

In some embodiments, the present methods comprise, consist of, or consist essentially of operating a vehicle with a roadarm that includes a semi-active rotary damper element; and replacing the semi-active rotary damper element with an active rotary damper element after one or more mission payload considerations change, the replacing occurring without replacing the roadarm.

Other embodiments of the present systems and methods are possible.

BRIEF DESCRIPTION OF THE DRAWINGS

The following drawings illustrate by way of example and not limitation. They are drawn to scale (in terms of proportions). Identical reference numerals do not necessarily indicate an identical structure. Rather, the same reference numeral may be used to indicate a similar feature or a feature with similar functionality. Not every feature of each embodiment is labeled in every figure in which that embodiment appears, in order to keep the figures clear.

DESCRIPTION OF ILLUSTRATIVE EMBODIMENTS

Figure 1:
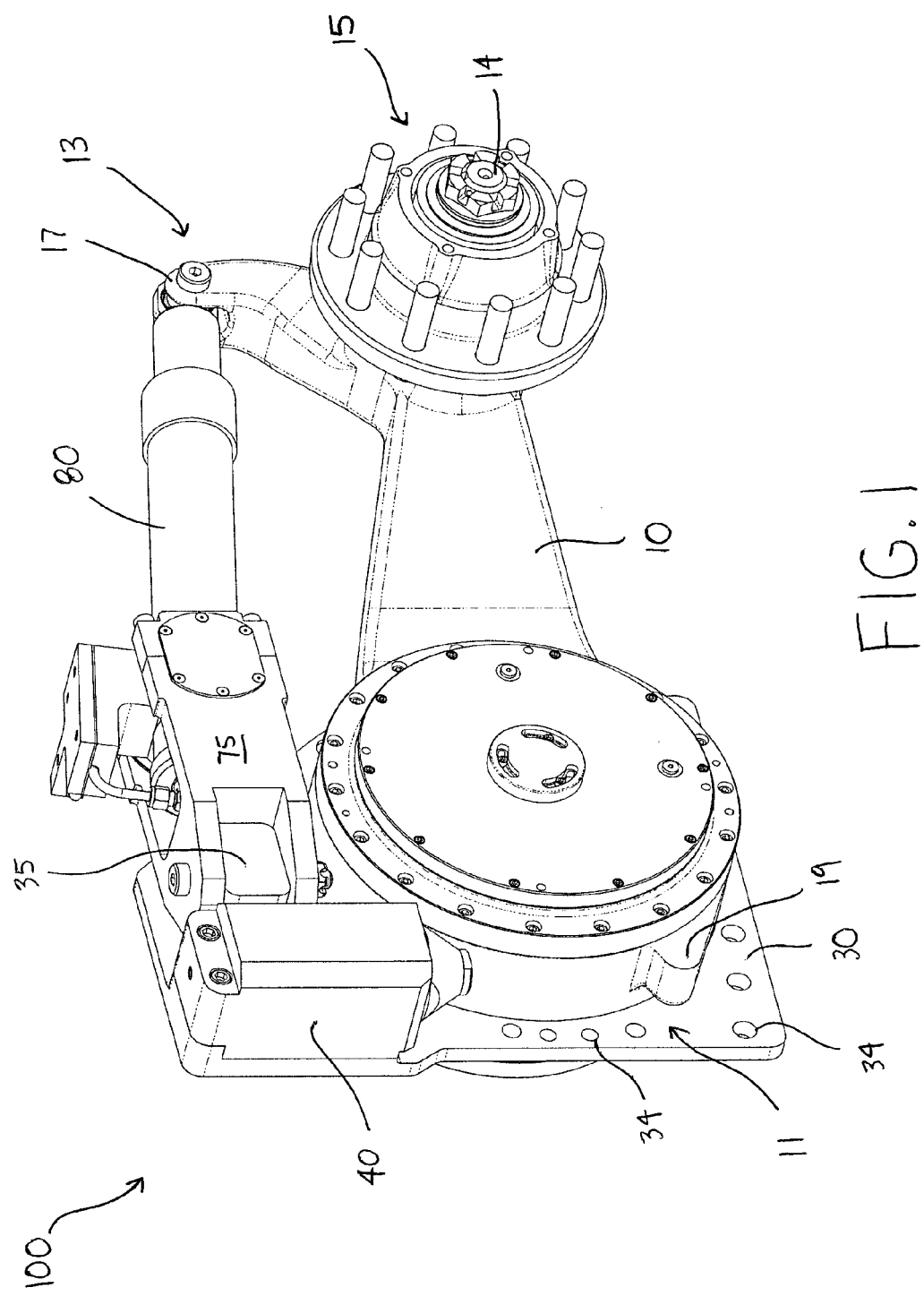
FIG. 1 is a perspective view of one of embodiment of the present systems, which includes a roadarm.

The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. As a result, a system or method that "comprises," "has," "contains," or "includes" one or more elements possesses those one or more elements, but is not limited to possessing only those one or more elements or steps. Likewise, an element of a system or method that "comprises," "has," "contains," or "includes" one or more features possesses those one or more features, but is not limited to possessing only those one or more features. Furthermore, a structure that is configured in a certain way must be configured in at least that way, but also may be configured in a way or ways that are not specified.

The terms "a" and "an" are defined as one or more than one unless this disclosure explicitly requires otherwise. The terms "substantially" and "about" are defined as at least close to (and includes) a given value or state (preferably within 10% of, more preferably within 1% of, and most preferably within 0.1% of). Metric units may be derived from the English units provided by applying a conversion and rounding to the nearest millimeter.

Suspension solutions fall into three general categories: passive, active, and semi-active. Passive suspension systems, the least expensive and lowest performance solutions, employ simple uncontrolled spring elements (e.g., steel coil springs or air springs), mechanically in parallel with uncontrolled damping elements (e.g., shock absorbers). Passive systems are capable of storing energy in its springs or removing energy through its dampers, but cannot add energy to the suspension/vehicle system.

Active suspension systems, usually the most expensive and highest performing solutions, employ fully controlled actuators—typically electromechanical or hydraulic—and a system of sensors on the vehicle. One or more processors read sensor information, compute control solutions, and send commands to the actuators such that actuator force or displacement outputs work to enhance vehicle body attitude and vibration isolation in the desired manner. Most commonly, the controlled actuators replace passive system dampers and are mechanically in parallel with uncontrolled springs. This allows springs to support vehicle static weight without consuming power in the actuators. Active suspension systems can operate in all four control quadrants, are capable of adding energy to or removing energy from the vehicle system, and can also store energy in springs or other energy storage devices (e.g., capacitors, hydraulic accumulators, etc.).

Semi-active suspension systems, typically between active and passive systems in cost and performance, employ uncontrolled spring elements and controlled variable damping elements. Semi-active systems are capable of storing energy in its springs or removing energy through its controlled dampers, but cannot add energy to the suspension/vehicle system. As in active systems, semi-active systems use a processor or processors that read sensor information, compute control solutions, and send commands to the controlled dampers such that their instantaneous (damping) force output favorably influences body motion for improved ride and cross country performance.

A very large percentage of combat vehicles are tracked. Tracked vehicles present special challenges to suspension designers because of the very limited space available for suspension components. To minimize tracked vehicle width—which is highly important in tight battlefield situations—and to facilitate transport on carrier vehicles, trailers, and aircraft, tracked vehicles have nearly universally evolved to trailing arm suspension configurations, with as little as 4 to 5 inches of space between the trailing arm and the vehicle hull, and typically with 5 to 7 road wheels on each side of the vehicle (thus, 10-14 wheel stations on the vehicle).

Early tracked vehicles employed torsion bars as their spring element, with the torsion bars attaching at trailing arm pivot points and being anchored within the vehicle (usually at the far side of the vehicle). This arrangement consumes a large amount of vehicle volume, most of it being under armor volume.

In modern tracked vehicles, torsion bars have generally been replaced with rotary spring elements at the pivot point of the trailing arm (frequently air springs) or linear spring elements within or parallel to the trailing arms (also frequently air springs). It is believed that the present systems and methods are particularly well-suited to use with modern tracked vehicles.

A preferred embodiment of the present systems and methods applicable to modern tracked vehicles with trailing arm suspension configurations may be used to provide any of the three suspension systems discussed above: a passive system, a semi-active system, and an active system. In this embodiment, all wheel stations for any of the suspensions systems may be identical or at least substantially identical. (In other embodiments, not all of the wheel stations are identical or substantially identical.)

For each wheel station in this embodiment, the vehicle hull may have an identical or substantially identical hole—typically 8-12 inches in diameter—that is surrounded by an identical or substantially identical set of bolt openings. (The term "hole" is interchangeable with the term "opening.") The roadarms (also known as "trailing arms") for all the wheel stations and all the suspension options are identical or substantially identical, as are the passive springs (such as air cylinder and piston assemblies that serve as air springs (which may also be characterized as "passive air springs"), coil springs, compressible fluid springs, or the like).

FIG. 1 is a perspective view of system 100, which is one embodiment of the present systems. System 100 includes a roadarm 10 having a first end designated generally by 11, a second end designated generally by 13, and an opening near the first end. Second end 13 is configured for attachment to (and, in this embodiment, is attached to) a passive spring 80. That configuration is achieved in this embodiment with a bracket 17 that is an integral part of roadarm 10. (In other embodiments, that configuration of second end 13 could be achieved with a non-integral bracket.) The opening is configured for interchangeable use with any of: (a) a passive suspension system damping element, (b) a semi-active suspension system damping element, and (c) an active suspension system actuator.

System 100 also includes baseplate 30, which is coupled to roadarm 10 and which includes a collar (not shown) that fits within the opening of roadarm 10. (In other embodiments of the present systems, the collar can be an integral part of a vehicle hull.) Baseplate 30 includes a group of openings 34 through which bolts or the like can be threaded in order to attach baseplate 30 to a vehicle hull. Baseplate 30 also includes a passive spring mounting element 35 to which a passive spring mounting bracket 75 can be coupled using, for example, a pin. Passive spring 80 can be coupled to baseplate 30 and roadarm 10 by pinning it using brackets 75 and 17 to provide desired degrees of freedom for the spring.

System 100 also includes a wheel mount 15 that is coupled to a spindle 14 (only the tip of which is visible) through one or more road wheel bearings. Spindle 14 is coupled to roadarm 10. Spindle 14 may be characterized as being configured for engagement with the bearing or bearings of a given road wheel. In the depicted embodiment, roadarm 10 also includes a protrusion 19 configured to contact bumpstop 40 of baseplate 30 when roadarm 10 rotates beyond an allowable amount. Bumpstop 40 may be, for example, a small cylinder filled with elastomer material, a short stroke damping unit, or any other suitable structure. Preferably, bumpstop 40 will not be contacted by protrusion 19 except for a very limited portion of the travel of roadarm 10: approximately 1 inch of vertical road wheel travel (vertical road wheel travel for most tracked vehicle applications should be 16 to 20 inches). As shown in FIG. 1, bumpstop 40 may be attached to baseplate 30 (or in other embodiments, directly to a vehicle hull) with bolts. As another alternative, some or all of bumpstop 40 may be integrally-formed with baseplate 30 or with a vehicle hull. Protrusion 19 may also be characterized as a bumpstop-engaging protrusion.

Figure 2A:
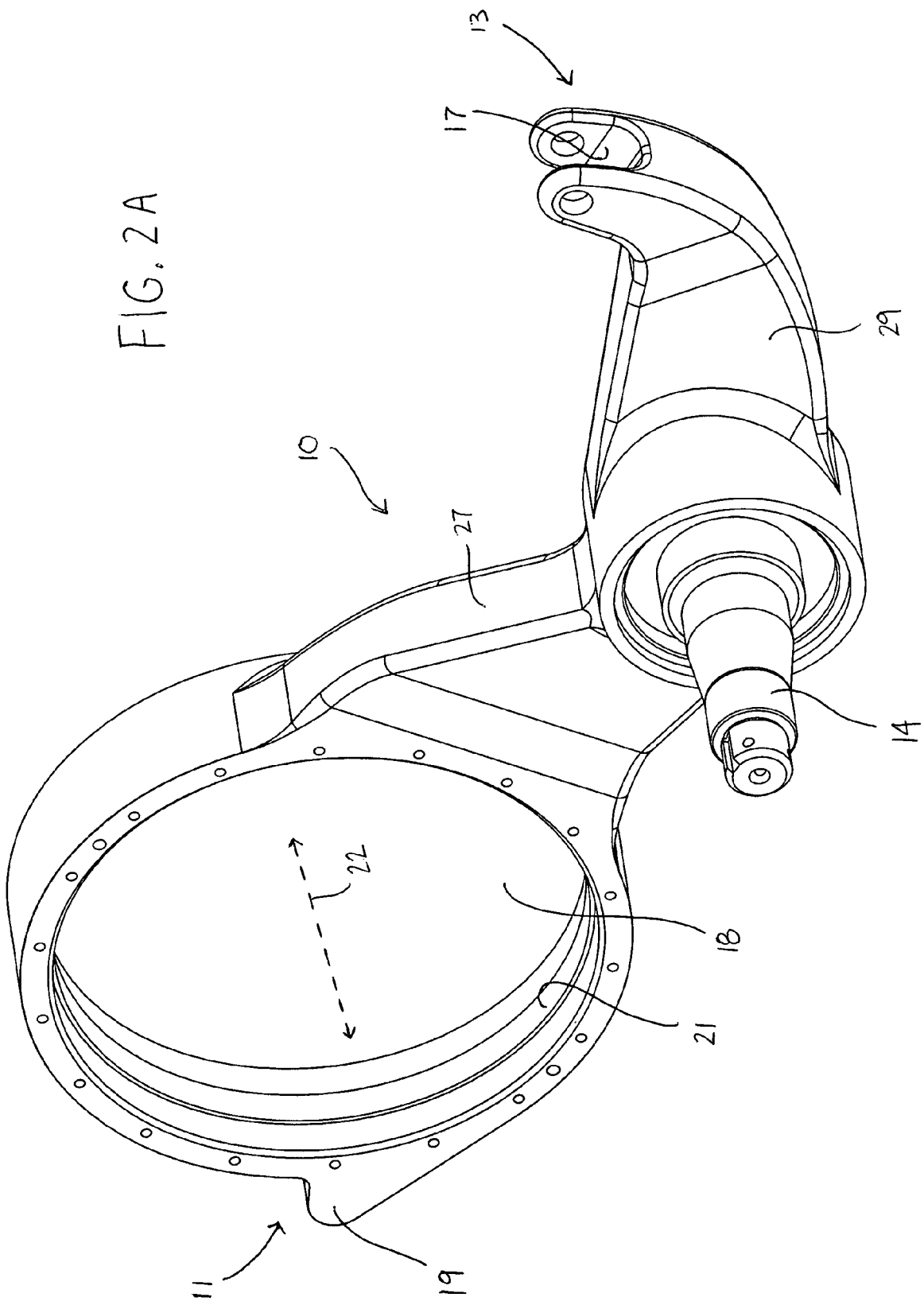
FIGS. 2A and 2B are different perspective views of the roadarm shown in FIG. 1.
Figure 2B:
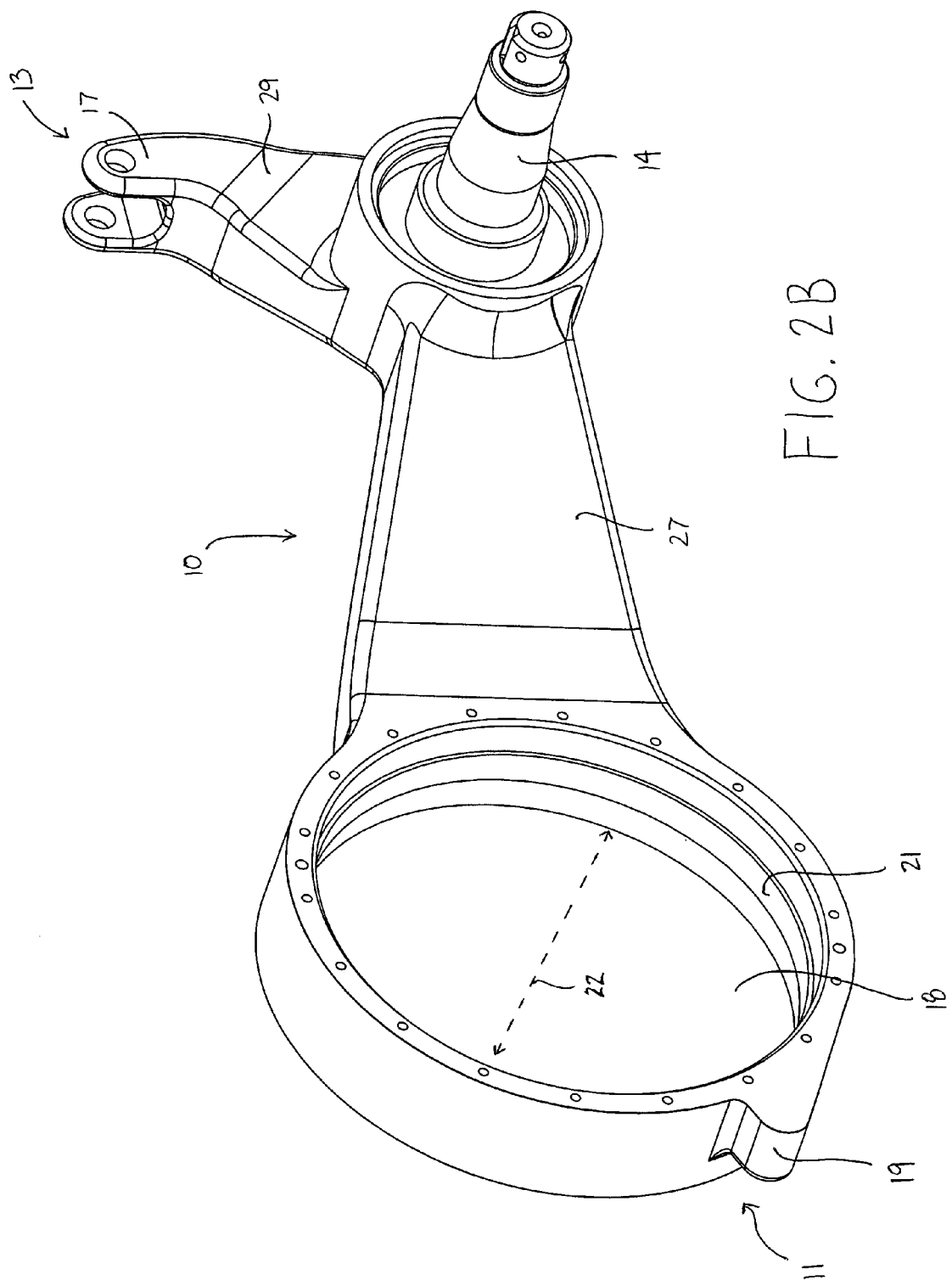
Figure 2C:
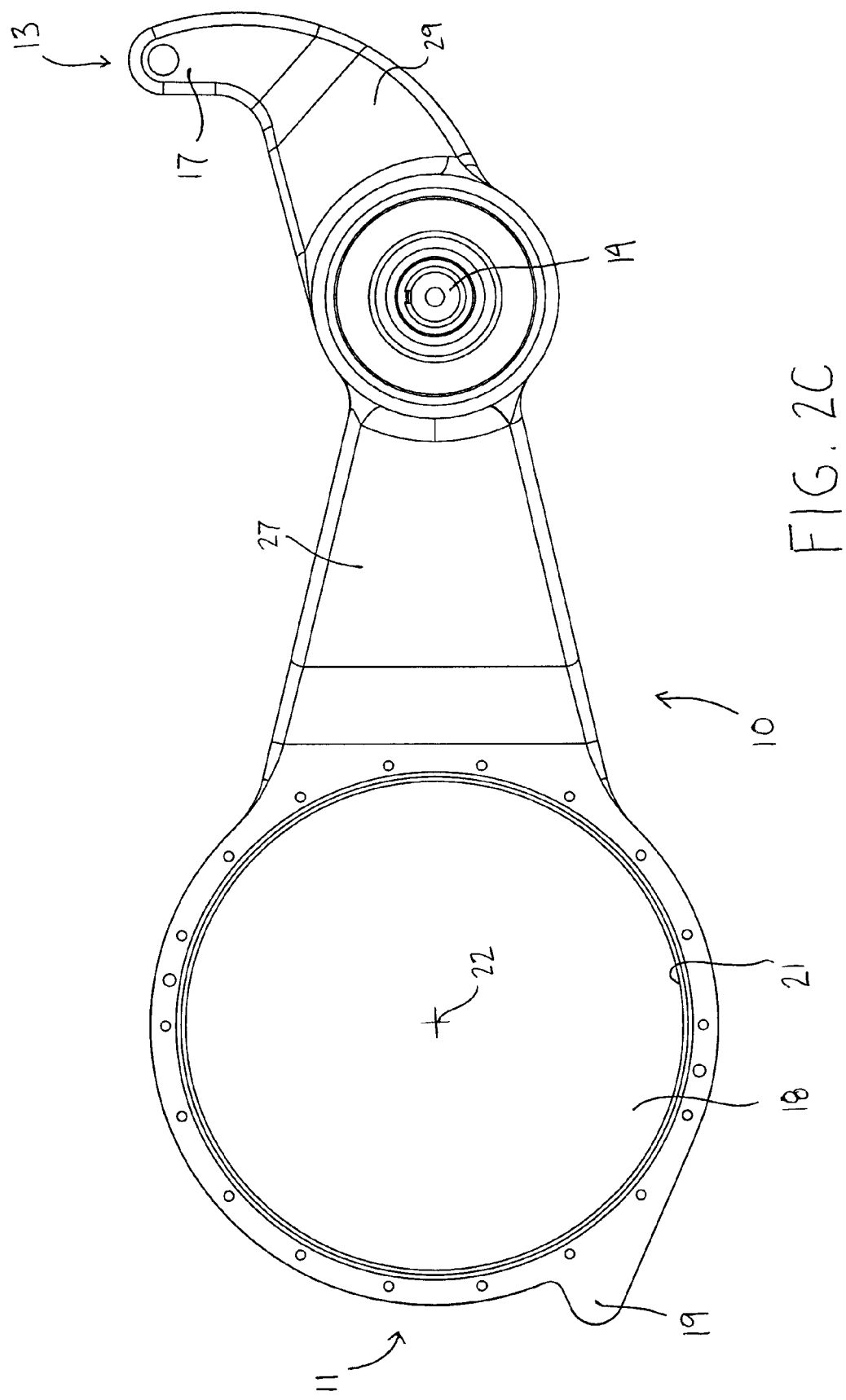
FIG. 2C is a front view of the roadarm shown in FIG. 1.
Figure 2D:
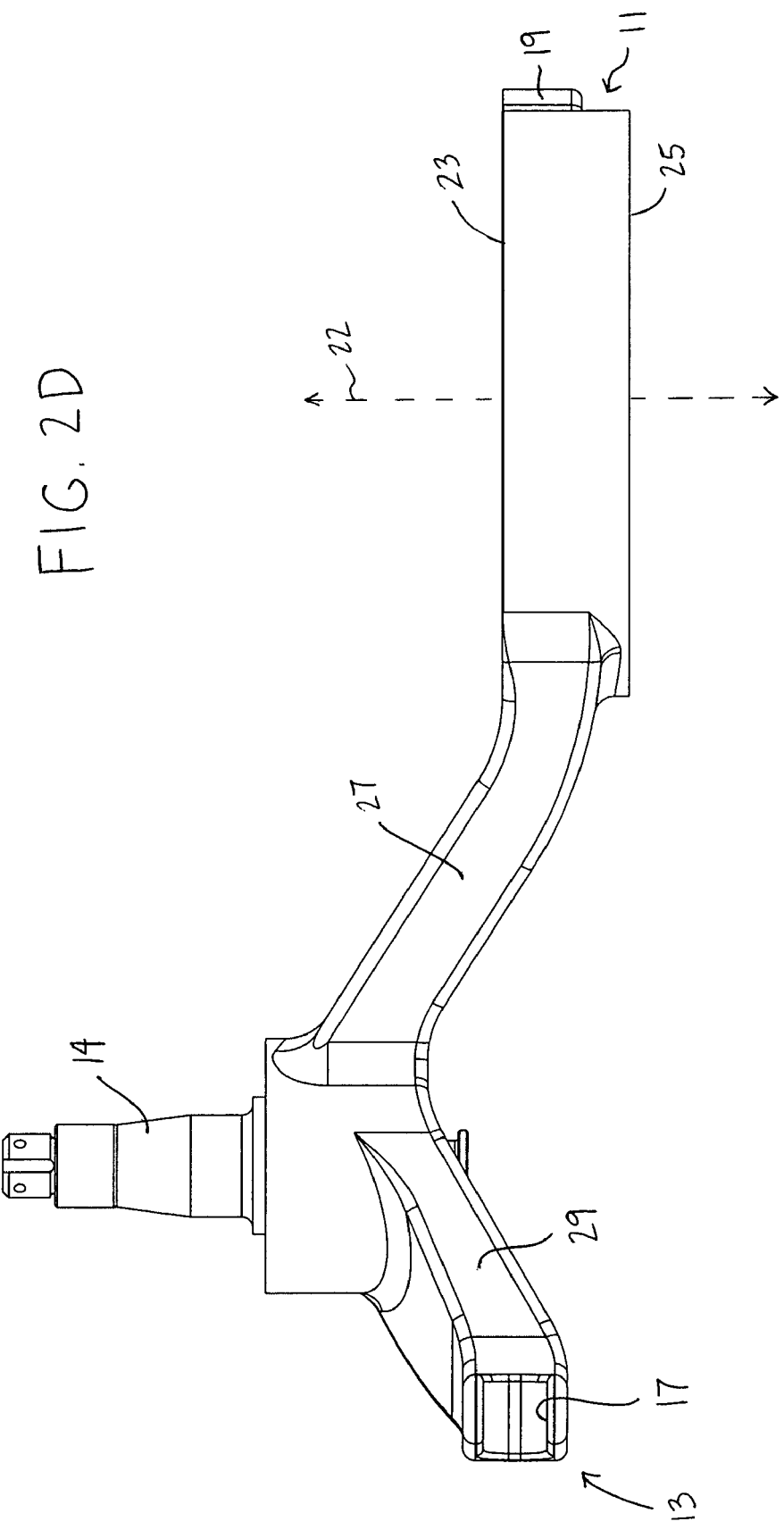
FIG. 2D is a top view of the roadarm shown in FIG. 1.
Figure 2E:
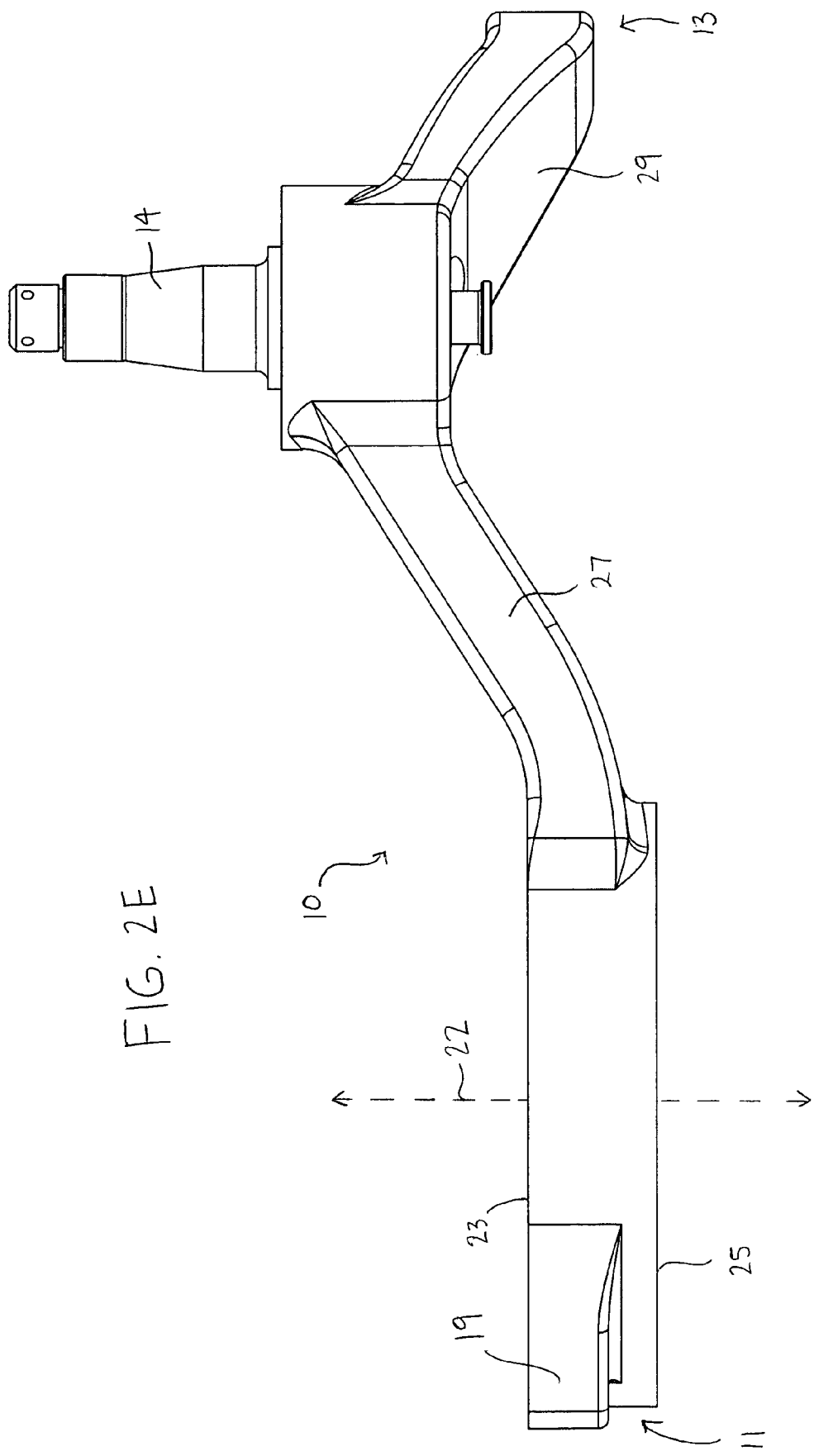
FIG. 2E is a bottom view of the roadarm shown in FIG. 1.
Figure 3A:
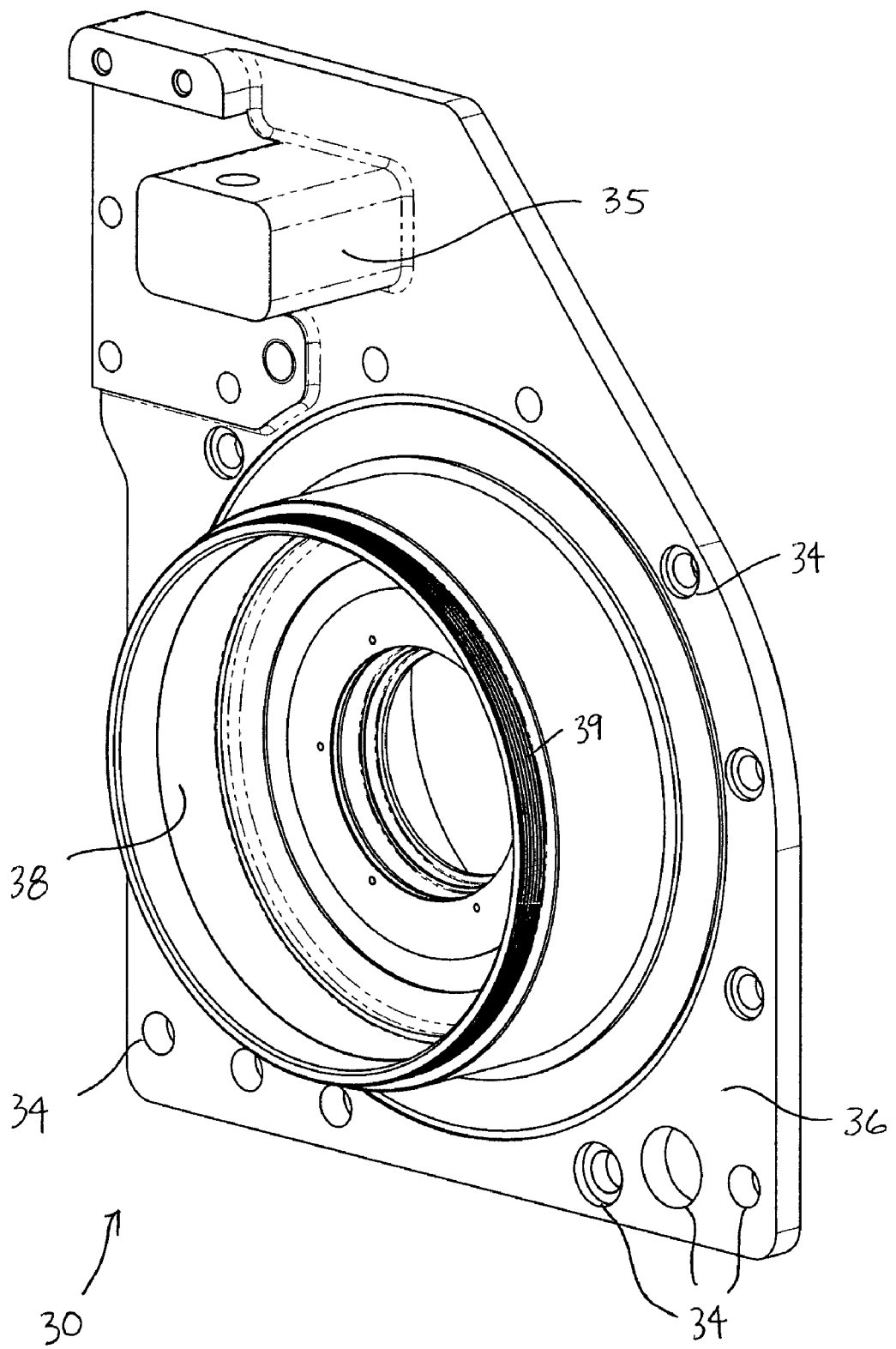
FIGS. 3A-3C are different perspective views of the baseplate shown in FIG. 1.
Figure 3B:
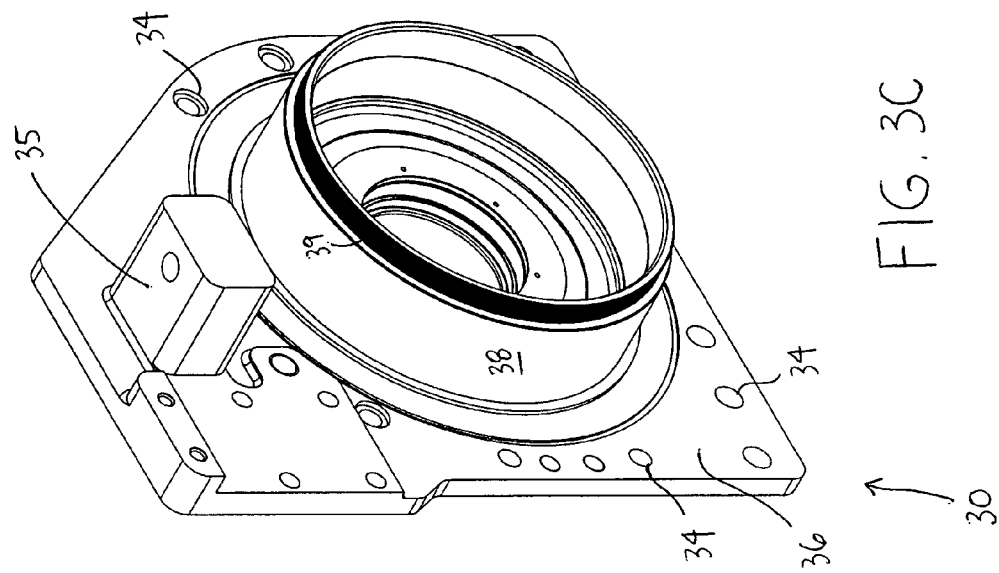
Figure 3C:
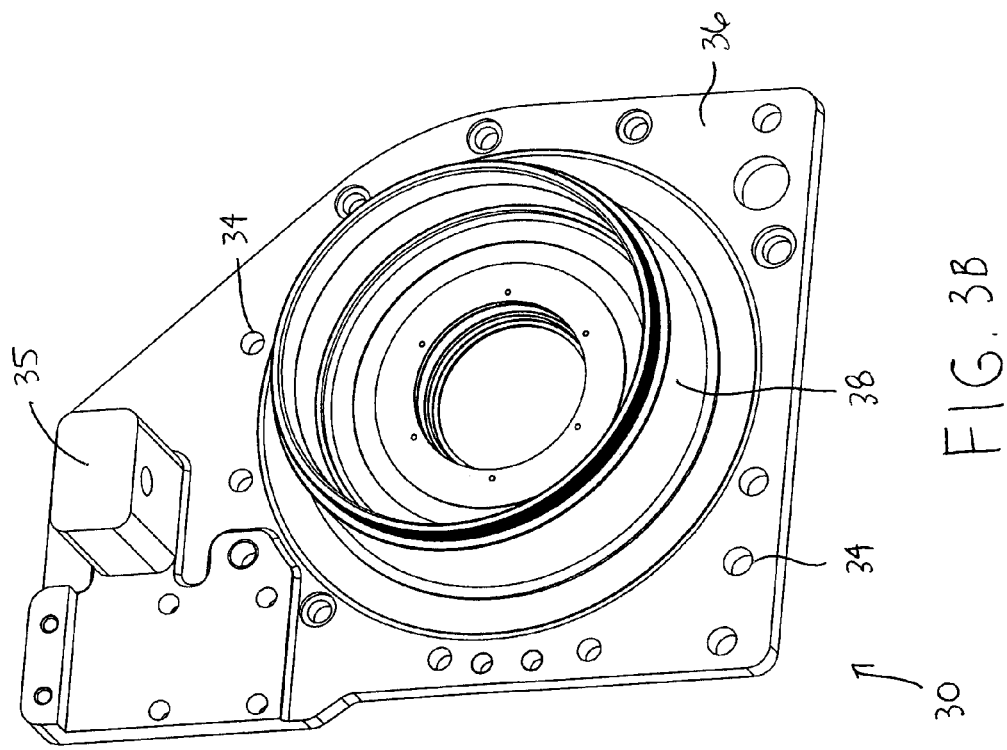
Figure 3D:
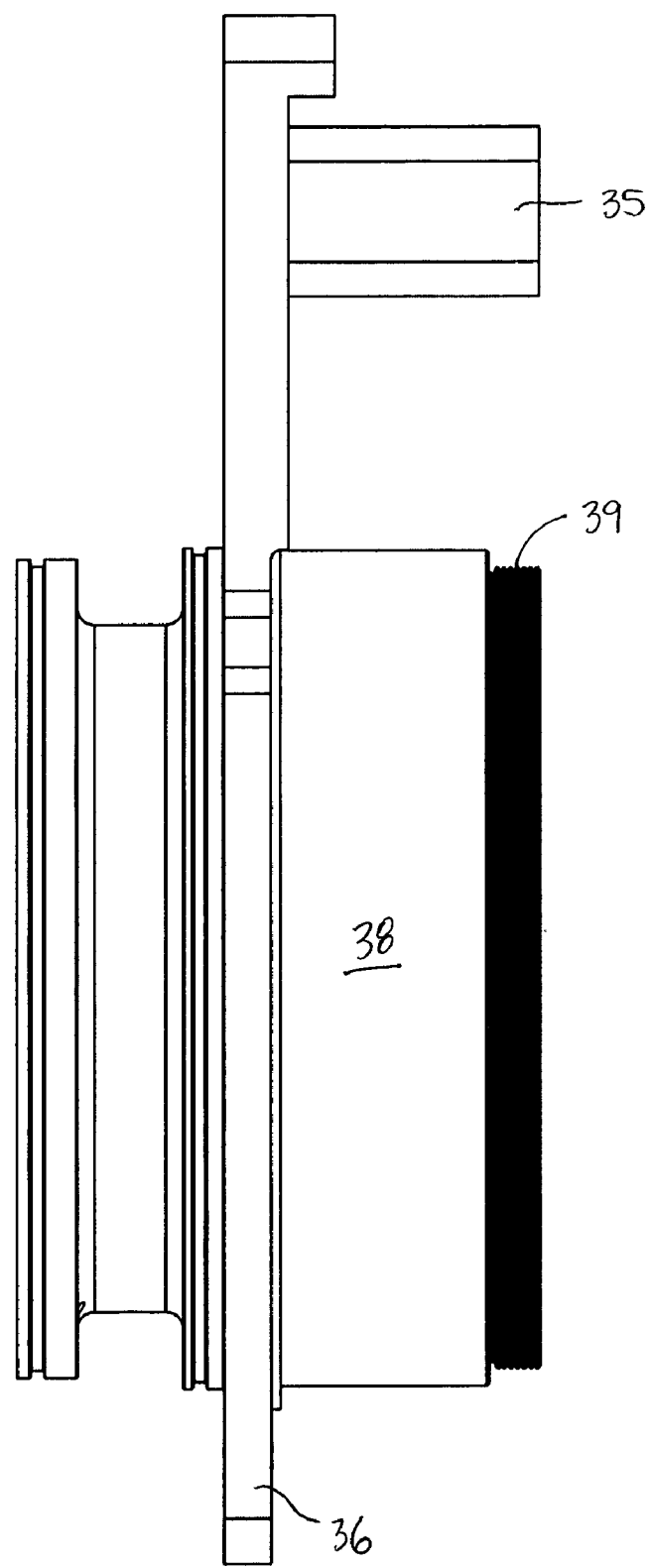
FIG. 3D is a left side view of the baseplate shown in FIG. 1.

FIGS. 2A-2E are different views of the embodiment of roadarm 10 shown in FIG. 1. These figures show opening 18, which is a portion of roadarm 10 that is configured to interface with the collar of baseplate 30 via one or more bearings (discussed below). A portion of opening 18 is defined by shoulder 21, which is a portion of roadarm 10 that extends inwardly from the remaining portion or roadarm 10 that defines the remainder of opening 18. Roadarm 10 is configured to pivot about axis 22, which runs through the center of (or is at least substantially centered in) opening 18. As FIGS. 2D and 2E show, the front face 23 and rear face 25 of the portion of roadarm 10 in which opening 18 is positioned are each positioned in a plane that is substantially perpendicular (and, in this embodiment, perpendicular) to axis 22.

FIGS. 2A-2E show that roadarm 10 includes a first arm section 27 that extends at a non-zero angle from the portion of roadarm 10 in which opening 18 is position and into the wheel mount portion of roadarm 10 to which spindle 14 is coupled. Roadarm 10 also includes a second arm section 29 that extends at a non-zero angle from the wheel mount portion to second end 13.

FIGS. 3A-3D show different views of the embodiment of baseplate 30 shown in FIG. 1. Baseplate 30 is configured for attachment to the hull of a given vehicle by virtue of openings 34. The pattern of openings 34 in baseplate 30 can be configured to correspond exactly or at least substantially with the pattern of openings provided in the vehicle hull. Preferably, if baseplates are used, each baseplate configured for use with a given vehicle has the same bolt opening (or fastener opening) pattern. Baseplate 30 may have any shape best suited for a given vehicle.

FIGS. 3A-3D show that baseplate 30 includes mounting portion 36 (which may be characterized as a flange) and collar 38, which protrudes away from mounting portion 36 and away from the portion of the vehicle hull to which baseplate 30 can be attached. Collar 38 includes a externally threaded portion 39. In some embodiments, the height H of collar 38 (see FIG. 5 for how to, measure the height) is less than (e.g., slightly less than, such as within 1 to 10 percent of) the depth of opening 18 of roadarm 10. In other embodiments, the height H of collar 38 is the same as the depth of opening 18. In other embodiments, the height H of collar 38 is greater than (e.g., slightly greater than, such as within 1 to 10 percent of) the depth of opening 18 of roadarm 10.

There are many suitable materials that may be used to make the present roadarms and baseplates, including steel, aluminum and titanium.

Passive spring 80 of the embodiment of system 100 shown in FIG. 1 can be any conventional passive spring—such as an air spring, a coil spring, or a compressible fluid spring—and need not be described further. Preferably, the passive, active, and semi-active suspension systems of at least some of the present systems will all use the same passive spring and passive spring connection hardware, although the passive springs may operate at different pressures in different suspension systems and may be supplemented by accumulators to allow different spring rates as desired for the three suspension system options.

Figure 4:
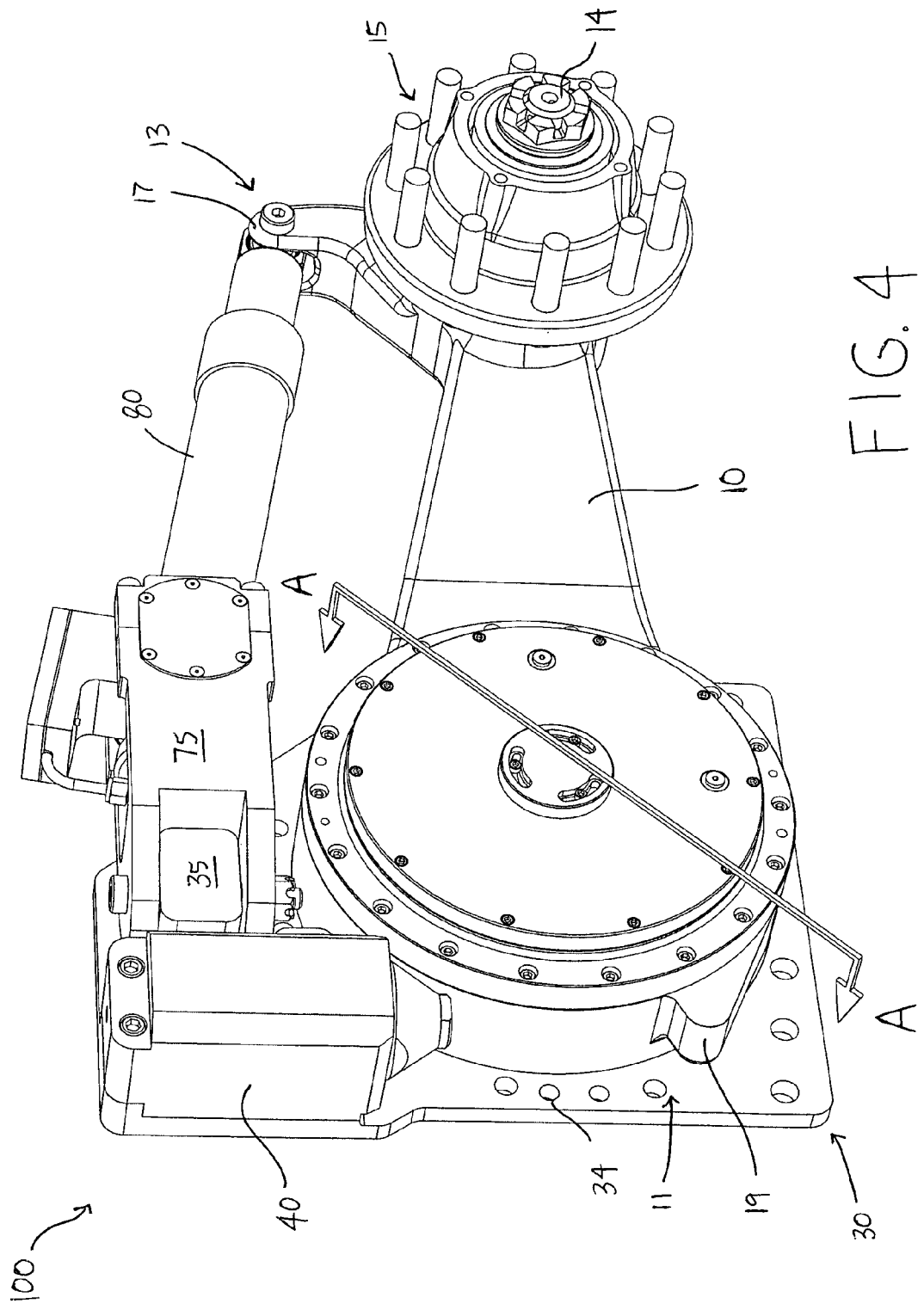
FIG. 4 is another perspective view of the system shown in FIG. 1, with a line indicating the direction along which a cross-sectional plane intersected the depicted roadarm in FIGS. 5-7.
Figure 5:
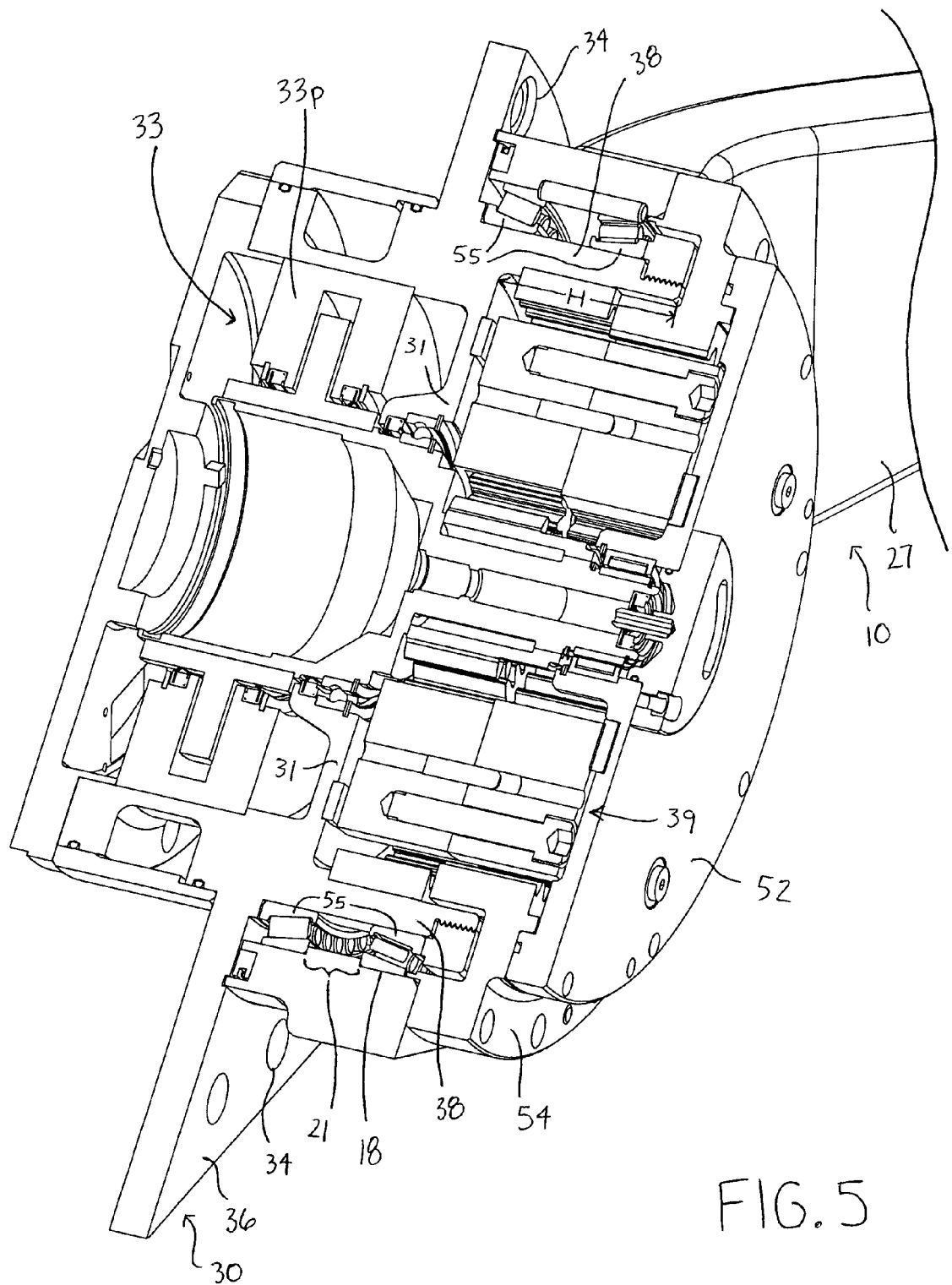
FIG. 5 is a partial showing a cross section taken along line A-A in FIG. 4 of the embodiment of the present systems shown in FIG. 1 in which a passive rotary damping element is coupled to the roadarm and to the collar.
Figure 6:
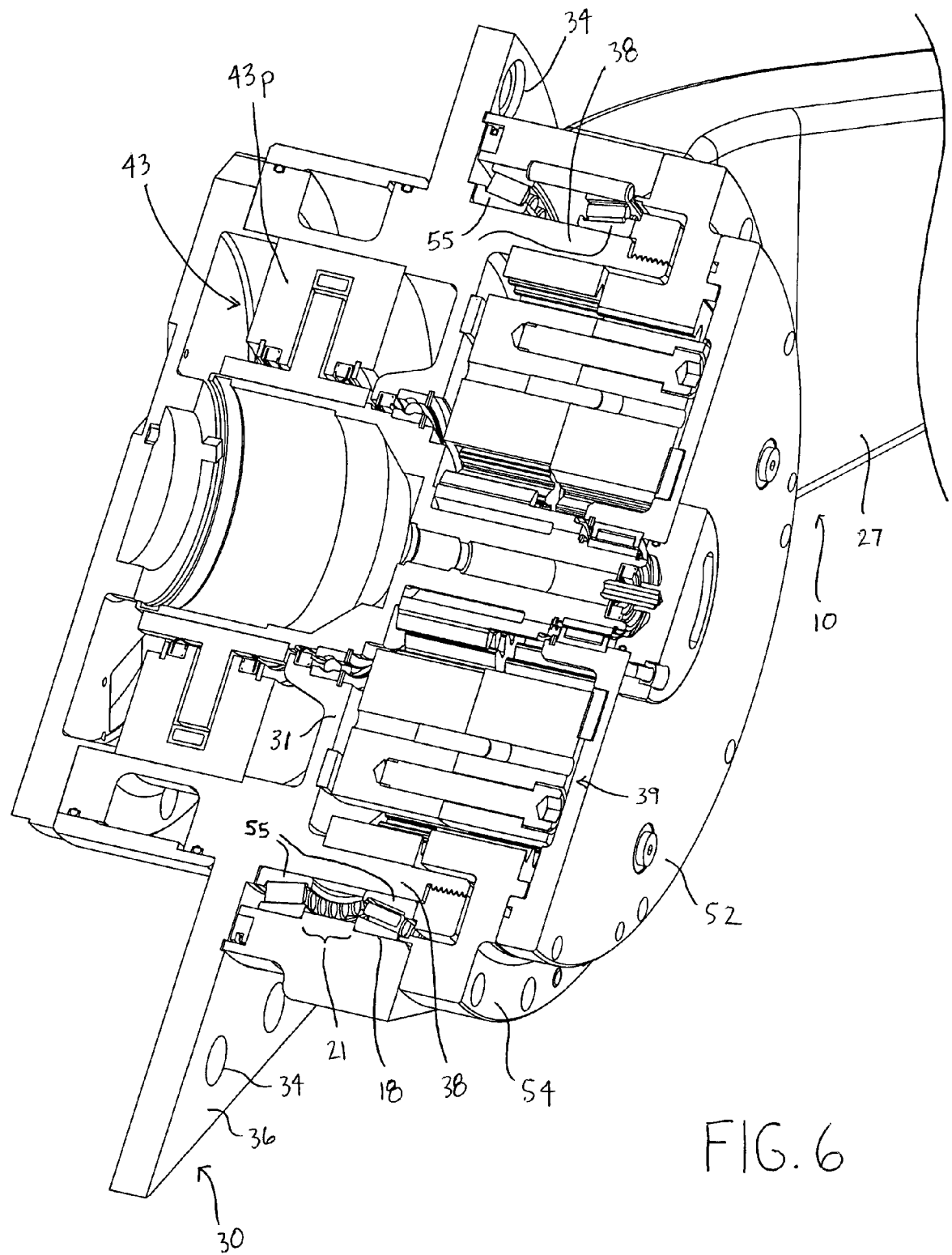
FIG. 6 is a partial showing a cross section taken along line A-A in FIG. 4 of the embodiment of the present systems shown in FIG. 1 in which a semi-active rotary damping element is coupled to the roadarm and to the collar.
Figure 7:
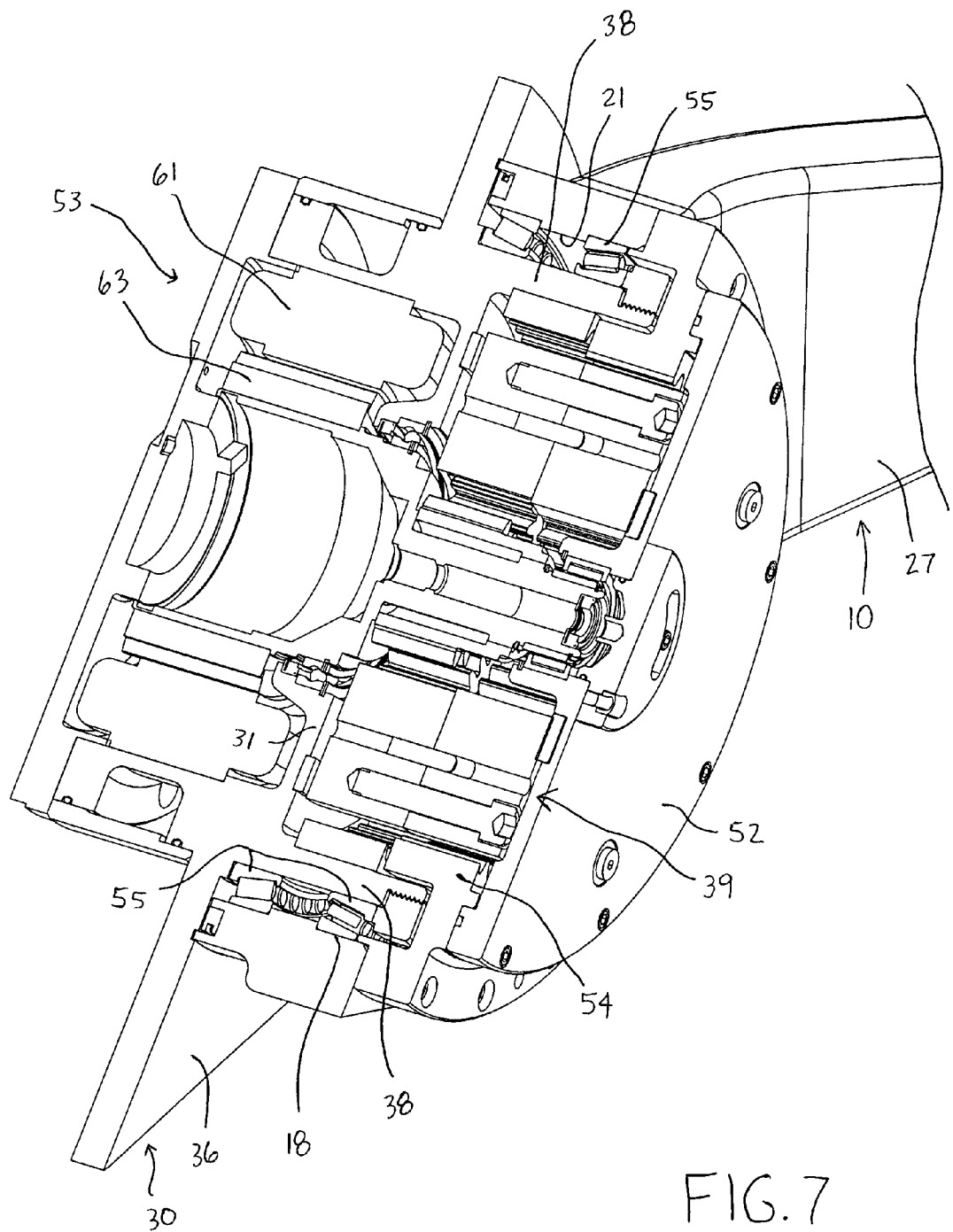
FIG. 7 is a partial showing a cross section taken along line A-A in FIG. 4 of the embodiment of the present systems shown in FIG. 1 in which an active rotary damping element is coupled to the roadarm and to the collar.

FIGS. 5-7 are cross-sectional views taken along the line A-A from FIG. 4 of passive, semi-active, and active suspension system versions of the embodiment of system 100 shown in FIG. 1.

In the passive version of system 100 shown in FIG. 5, opening 18 (which is the same as saying the portion of roadarm 10 that defines opening 18) contains at least a portion of a standard passive suspension system damping element, such as the rotary damper element designated generally as 33 (which may also be characterized as a rotary damping element, a rotary damper mechanism, a rotary damping mechanism, a rotary damper system, or a rotary damping system). Rotary damper element 33 includes a gear set 39 (which, in other embodiments, is not used) and a damper 33$p$. The gear set 39 may be any suitable gear set that can match damper characteristics (e.g., damping force and speed) with expected roadarm rotational speeds, such that the gear set functions as a gear reduction system. Gear set 39 is shown in FIG. 5 as a planetary gear set, although other gear reduction systems are possible. Gear set 39 is located ahead of gear support shoulder 31 of baseplate 30 (like collar 38, the gear support shoulder can be an integral part of a vehicle hull in other embodiments), and is at least partially surrounded by a forward gear set housing structure 54 that is attached (e.g., with bolts) to roadarm 10, by collar 38, and by opening 18. Front plate 52, which is attached to structure 54, protects the front of rotary damper element 33. Damper 33$p$ is positioned behind support shoulder 31.

The roadarm material that defines opening 18 need not be in direct contact with rotary damper element 33 to contain at least a portion of it; for example, collar 38 and bearings 55 are positioned between the two (the same as true of the semi-active and active versions shown in FIGS. 6 and 7, respectively).

While some embodiments of opening 18, collar 38, and most generally roadarm 10 of system 100, are configured for interchangeable use with passive, semi-active, and active suspension variants, it is possible in those embodiments to use a linear damping topology instead of some type of rotary damper or actuator that is at least partially contained within opening 18. For example, in the passive system case, a passive linear damper could be integrated with the passive spring (e.g., passive spring 80) so as to yield, for example, (a) an air-over-oil spring in series with a passive linear acting damper, or (b) a passive linear acting damper (e.g., one that is cylindrical in shape) mounted parallel to the passive spring. In some such instances, the resulting passive damping mechanism may or may not include a gear reduction system, and may or may not be supplemented by a rotational damper, such as rotary damper element 33.

In the semi-active version of system 100 shown in FIG. 6, opening 18 contains at least a portion of a semi-active suspension system damping element, such as the controlled rotary damper element designated generally as 43 (which may also be characterized as a controlled rotary damper mechanism, a controlled rotary damping mechanism, a controlled rotary damper system, or a controlled rotary damping system). The most common options for controlled rotary damper element 43 include hydraulic controlled servo-valve systems or systems based on magneto-rhealogical (MR) fluid.

Controlled rotary damper element 43 includes a gear set 39 (which, in other embodiments, is not used) and a semi-active damper 43$p$. The gear set 39 may be any suitable gear set that can match damper characteristics (e.g., damping force and speed) with expected roadarm rotational speeds, such that the gear set functions as a gear reduction system. Gear set 39 is shown in FIG. 6 as a planetary gear set, although other gear reduction systems are possible. Gear set 39 is located ahead of gear support shoulder 31 of baseplate 30 (like collar 38, the gear support shoulder can be an integral part of a vehicle hull in other embodiments), and is at least partially surrounded by a forward gear set housing structure 54 that is attached (e.g., with bolts) to roadarm 10, by collar 38, and by opening 18. Front plate 52, which is attached to structure 54, protects the front of controlled rotary damper element 43. Semi-active damper 43*p* is positioned behind support shoulder 31.

For a linear damping topology in the semi-active system case, a semi-active linear damper could be integrated with the passive spring (e.g., passive spring 80) so as to yield, for example, (a) an air-over-oil spring in series with a servo-valve semi-active linear acting damper, (b) an air-over-oil spring in series with an MR fluid semi-active linear acting damper, or (c) linear acting semi-active damper mounted in parallel to the passive spring. In some such instances, the resulting semi-active damping mechanism may or may not include a gear reduction system.

In the active version of system 100 shown in FIG. 7, opening 18 contains at least a portion of an actuator that includes a gear set and a motor. The actuator designated generally as 53 in FIG. 7 includes a gear set 39 (which, in other embodiments, is not used). The gear set 39 may be any suitable gear set that can match damper characteristics (e.g., damping force and speed) with expected roadarm rotational speeds, such that the gear set functions as a gear reduction system. Gear set 39 is shown in FIG. 7 as a planetary gear set, although other gear reduction systems are possible. Gear set 39 is located ahead of gear support shoulder 31 of baseplate 30 (like collar 38, the gear support shoulder can be an integral part of a vehicle hull in other embodiments), and is at least partially surrounded by a forward gear set housing structure 54 that is attached (e.g., with bolts) to roadarm 10, by collar 38, and by opening 18. Front plate 52, which is attached to structure 54, protects the front of actuator 53.

Actuator 53 also includes a rotary motor positioned behind support shoulder 31. The motor may be a permanent magnet (PM) brushless direct current (DC) motor that includes a stator 61 and a rotor 63, and may be positioned on a shaft (not shown) that is common to planetary gear set 39 and the rotary motor. Other motor types, such as induction, reluctance, synchronous, or others may also be used. A set of one or more sensors (not shown, and which may form part of the control system discussed below) may be housed within rotor 63. Preferably, the length (which also may be referred to as the depth) of the motor is approximately equal to or less than the thickness of the vehicle hull, such that protrusion into the interior of the vehicle body is minimized, and most preferably does not exist. Most embodiments of the present systems that are equipped for semi-active or passive suspension systems will fit within the space envelope occupied by the active suspension system version of this system embodiment.

For a linear damping topology in the active system case, a linear electromechanical or hydraulic actuator could be used in series with or parallel to the passive spring (e.g., passive spring 80). In some such instances, the resulting active actuator mechanism may or may not include a gear reduction system.

Figure 8:
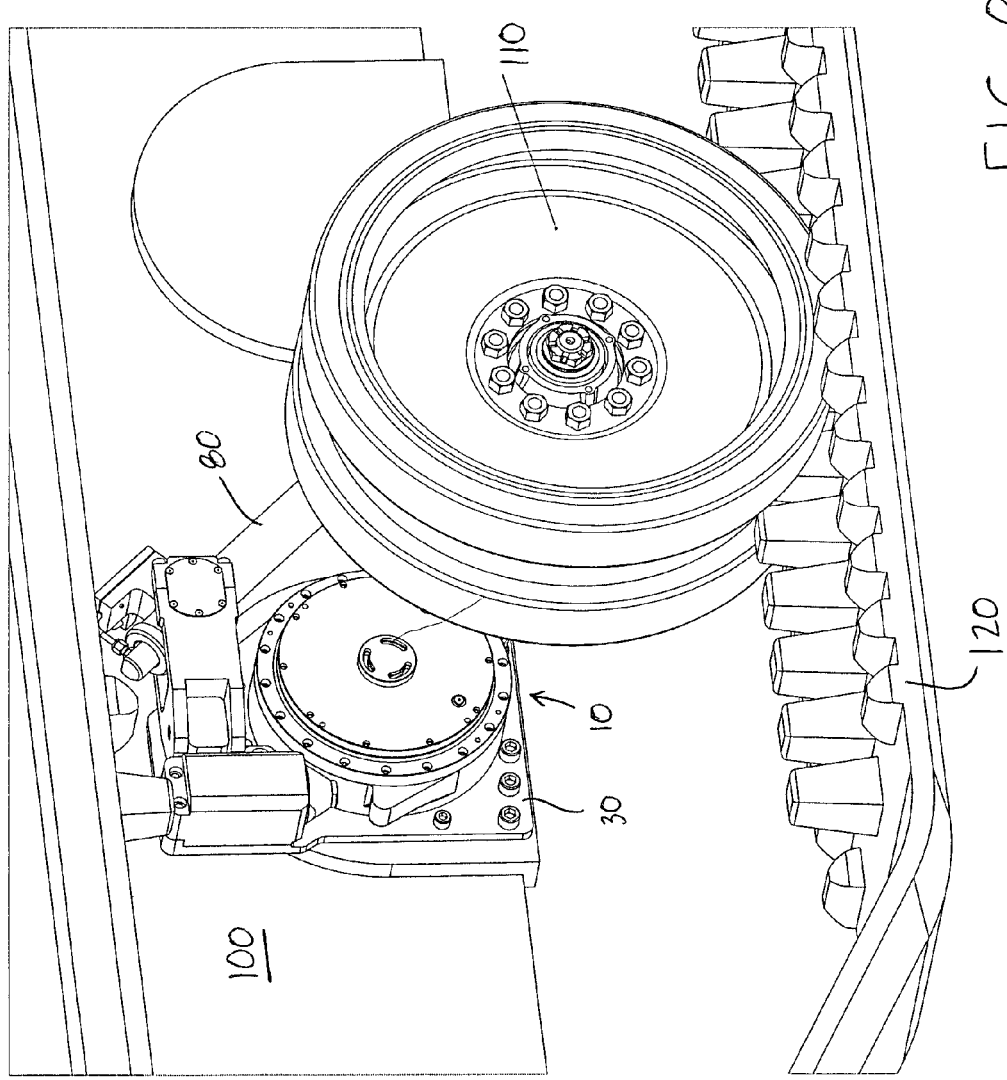
FIG. 8 is a perspective view of the embodiment of the present systems shown in FIG. 1 attached to a vehicle hull of a tracked vehicle.

FIG. 8 shows an embodiment of system 100 in which baseplate 30 is attached via bolts to vehicle hull 105. For context, FIG. 8 also shows road wheel 110 mounted to the wheel station that is coupled to the spindle that is coupled to roadarm 10, and track 120.

Figure 9:
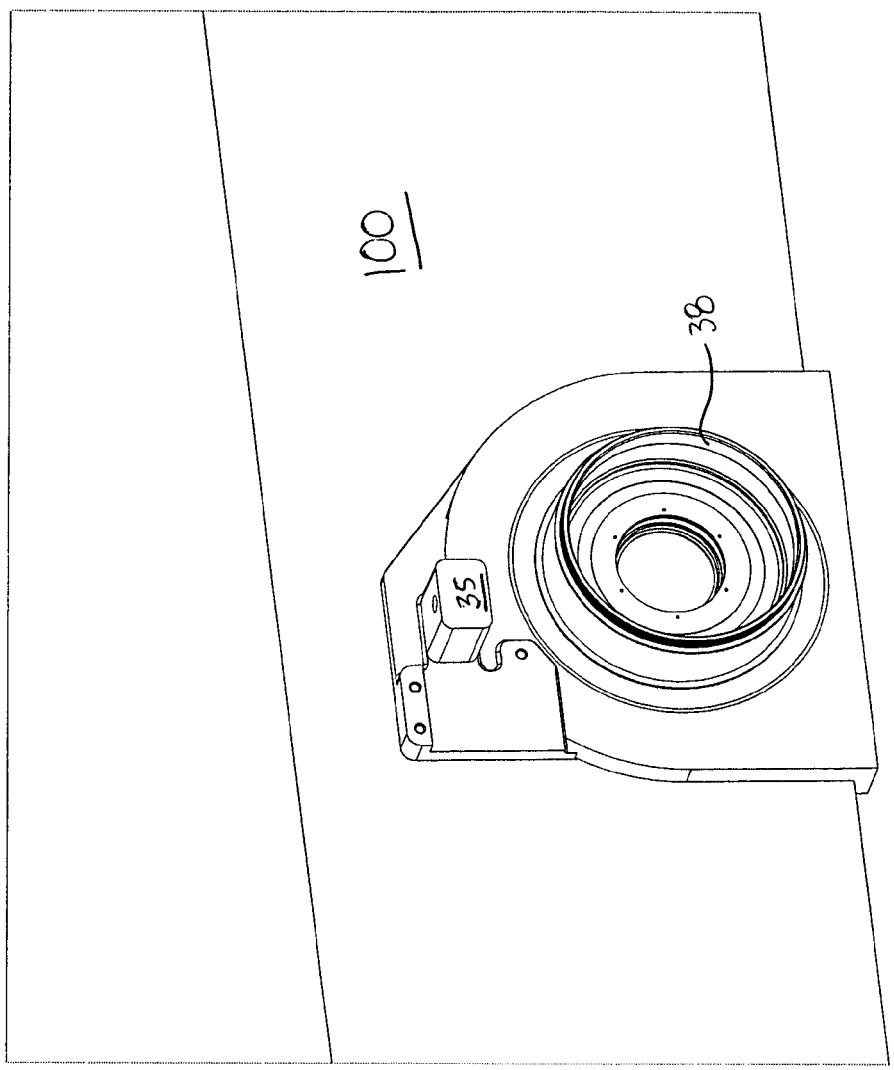
FIG. 9 shows another embodiment of one of the present collars, in which the collar is an integral part of a vehicle hull.

In other embodiments of the present systems, the collar described above can be integrated into the vehicle hull, instead of being attached to it as shown in FIG. 8. FIG. 9 shows an embodiment of the present systems in which collar 38 is an integral part of vehicle hull 105, as is passive spring mounting element 35. The depicted embodiment of vehicle hull 105 is also configured such that a bumpstop (not shown) can be attached to it.

Figure 10:
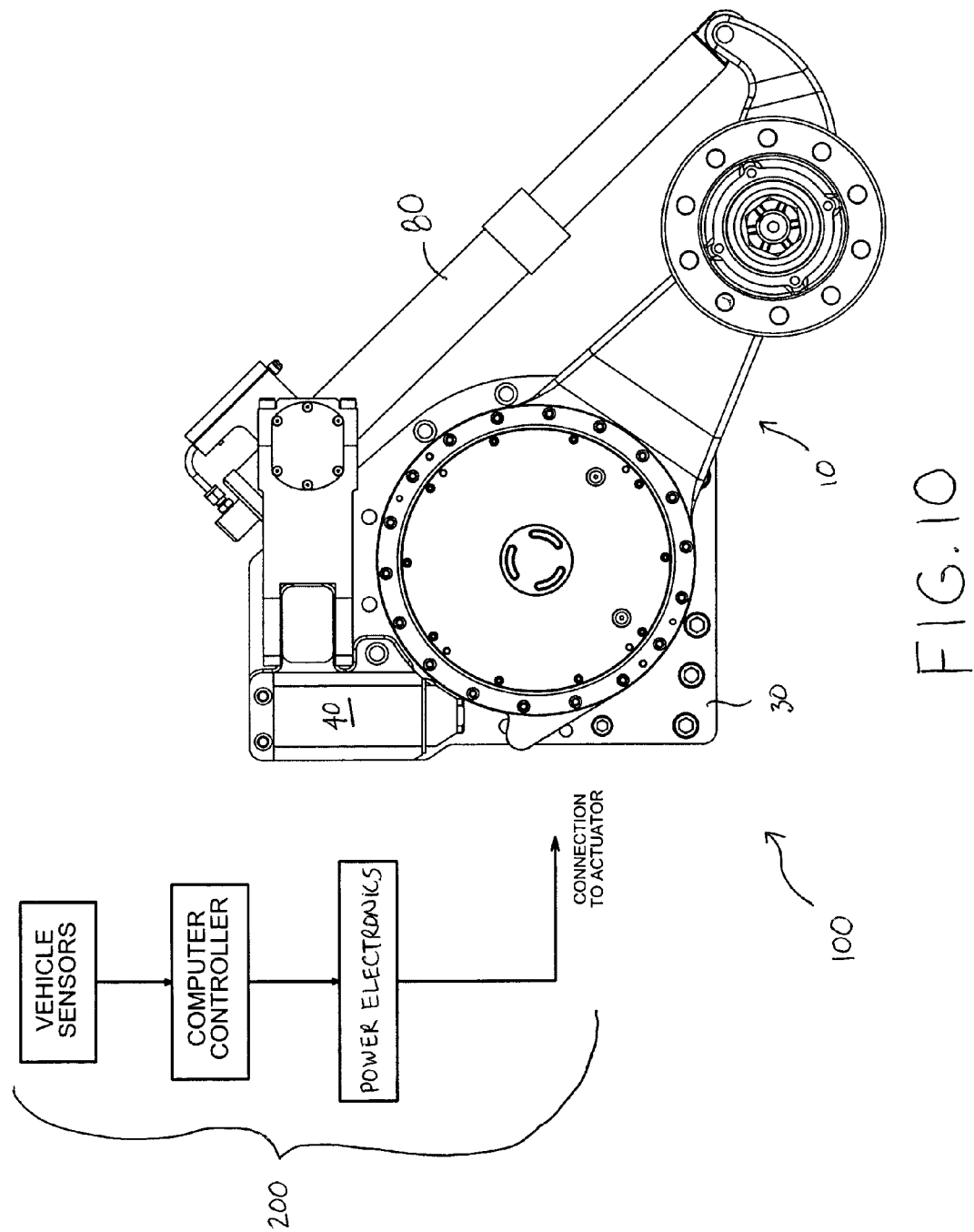
FIG. 10 shows a front view of the embodiment of the present systems shown in FIG. 1 in combination with a control system.

As FIG. 10 shows, some embodiments of the present systems include a control system 200 that is configured to control both a semi-active damping element and an active actuator, meaning that the control system includes the necessary hardware and software to control either, depending on which is used. This does not mean that the same hardware and software will necessarily be used to control both.

Control system 200 may include sensors, control algorithms (e.g., in software), and power electronics. Preferably, the control system algorithms used are those disclosed in U.S. Pat. No. 5,999,868, which is incorporated by reference in its entirety. Following this preference, the control hardware, sensors, and software may be the same for both the active and semi-active suspension system versions. A single vehicle-mounted triaxial accelerometer and a triaxial roll rate sensor may be used in both versions. This will allow full calculation of estimated vertical accelerations at each wheel station; vehicle pitch, roll, and yaw rates; longitudinal acceleration; and lateral acceleration as needed for full control using the near-constant force approach described in the '868 patent and as needed to enhance platform attitude control. If the vehicle body is too flexible, the single vehicle-mounted triaxial accelerometer may be supplemented by a single axis vertical accelerometer at each vehicle corner.

The active suspension control algorithms described in the '868 patent also compute the semi-active control solution. For the semi-active suspension system version, however, if the control solution desire's a motoring force for the actuator (which adds energy to the system), the command sent to the actuator is set to zero (the semi-active actuator is only capable of damping, or removing energy from the system). Consequently, in the preferred embodiment, the same sensor system, sensor architecture, control hardware, control software, and control architecture serve both active and semi-active suspension systems.

The major difference between the semi-active and active suspension versions of this embodiment, besides the actuators themselves, involves the power electronics. The active system version may use servo-amplifiers to drive and control motors (such as the brushless DC PM motors capable of bi-directional operation (i.e., operates in all four control quadrants)) and provide the necessary motor commutation control. The semi-active system version may use less capable, less expensive power electronics, such as a simple amplifier for the MR fluid system, or servo-valve control electronics for the servo-valve based semi-active system.

Some embodiments of control system 200 may be configured to control (e.g., operate) an active or semi-active suspension system (such as semi-active 43 or active actuator 53) such that if the control system detects that a motor force is desired or otherwise required by one or more of the sensors of the actuator in question, the command sent to the semi-active actuator in such a situation is zero, whereas the comparable command sent to the active actuator in the same situation is non-zero. Some of the present methods include providing such a control system, and delivering such commands in response to receiving one or more signals indicated the desired/required motor force condition.

In some uses of the present systems, a given vehicle may employ an active system version on some wheel stations, and passive and/or semi-active versions on other wheel stations. This approach will be most effective if the active version wheel stations are at the front and rear of the vehicle, and may result in overall system cost reductions with only minor performance degradation compared to using active systems at all wheel stations. Thus, some of the present systems comprise a vehicle. (e.g., a tracked vehicle) that includes at least two different suspension systems (e.g., 2 or 3) at different wheel stations of the vehicle, the suspensions systems being either a passive suspension system, a semi-active suspension system, and an active suspension system (stated another way, the suspension systems being chosen from the group consisting of a passive suspension system, a semi-active suspension system, and an active suspension system). Thus, and for example, if a given vehicle has 4 wheel stations per side, one of those wheel stations for a given side may have a passive suspension system (e.g., an embodiment of system 100 with actuator 33), two may have a semi-active suspension system (e.g., an embodiment system 100 with actuator 43), and one may have an active suspension system (e.g., an embodiment of system 100 with actuator 53). Some embodiments of the present methods comprise providing such a vehicle (i.e., a vehicle having two or more different suspension systems at different wheel stations).

Some embodiments of the present methods involve providing a common envelope space into which any of the three suspension systems discussed above may fit and be used with a vehicle, such as a tracked vehicle (e.g., an armored tank). As a result, such embodiments of the present methods allow users to upgrade and downgrade between suspensions systems at the various wheel stations of a vehicle without altering the size of the hull opening into which a portion (not the fasteners) of a suspension is placed, and/or without altering the size of the roadarm opening or collar. Consequently, the time with which it takes to change the suspension system at a given wheel station depending on changing mission payload considerations and the like should be minimized, as should the associated cost. Furthermore, certain of the present methods involve controlling the actuators (which is a generic term that encompasses passive system damping elements, semi-active system damping elements, and active system actuators) of semi-active and active suspension systems using a control system, such as control system 200, that includes one or more of control hardware, sensors, sensor architecture, software, and power system architecture.

Some embodiments of the present methods involve upgrading to a semi-active or active suspension system from a passive suspension system for a given wheel using the same roadarm or another roadarm that is substantially identical (or identical) to the originally-used roadarm (e.g., roadarm 10). That upgrade may occur in response to one or more mission payload considerations for the vehicle in question.

Some embodiments of the present methods involve upgrading to an active suspension system from a semi-active suspension system for a given wheel using the same roadarm or another roadarm that is substantially identical (or identical) to the originally-used roadarm (e.g., roadarm 10). That upgrade may occur in response to one or more mission payload considerations for the vehicle in question.

It should be understood that the present systems and methods are not intended to be limited to the particular forms disclosed. Rather, they are to cover all modifications, equivalents, and alternatives falling within the scope of the claims.

The claims are not to be interpreted as including means-plus- or step-plus-function limitations, unless such a limitation is explicitly recited in a given claim using the phrase(s) "means for" or "step for," respectively.

I claim:

1. A system comprising:
a roadarm having a first end, a second end, and an opening near the first end;
a collar that fits within the opening, the collar being attachable to, or an integral part of, a vehicle hull; and
a bearing positioned around the collar and inside the opening;
a passive spring attached to the second end of the roadarm and positioned outside of the roadarm;
where the opening is configured for interchangeable use with any of: (a) a passive suspension system damping element, (b) a semi-active suspension system damping element, and (c) an active suspension system actuator.

2. The system of claim 1, further comprising:
a passive suspension system damping element contained at least partially within the opening.

3. The system of claim 1, further comprising:
a semi-active suspension system damping element contained at least partially within the opening.

4. The system of claim 1, further comprising:
an active suspension system actuator contained at least partially within the opening.

5. The system of claim 1, in which the roadarm includes a protrusion configured to contact a bumpstop when the roadarm over-rotates.

6. The system of claim 5, further comprising:
a bumpstop configured to contact the protrusion when the roadarm over-rotates.

7. The system of claim 1, further comprising:
a control system configured to control both a semi-active suspension system damping element, and an active suspension system actuator.

8. A system comprising:
a roadarm having an opening;
a collar that fits within the opening;
a bearing positioned around the collar and inside the opening;
a passive spring attached to and positioned outside of the roadarm; and
one of a semi-active suspension system damping element and an active suspension system actuator surrounded, at least in part, by the collar;
the opening and collar being configured such that, without modifying either of them, the system will operate at different times with the other of the semi-active suspension system damping element and the active suspension system actuator.

9. The system of claim 8, where the collar is attachable to, or an integral part of, a vehicle hull.

10. The system of claim 8, where the semi-active suspension system damping element is surrounded, at least in part, by the collar.

11. The system of claim 8, where the active suspension system actuator is surrounded, at least in part, by the collar.

12. The system of claim 8, in which the roadarm includes a protrusion configured to contact a bumpstop when the roadarm over-rotates.

13. The system of claim 12, further comprising:
a bumpstop configured to contact the protrusion when the roadarm over-rotates.

14. The system of claim 8, further comprising:
a control system configured to control both a semi-active suspension system damping element, and an active suspension system actuator.

15. A method comprising:
creating a female common space envelope in an end of a roadarm that is configured to be attached to a vehicle hull, the roadarm having a spindle and a trailing end that is positioned closer to the spindle than to the end of the roadarm that is configured to be attached to a vehicle hull;
placing a collar within the female common space envelope; and
placing a bearing around the collar and within the female common space envelope, the female common space envelope being configured such that any of the following will fit at least partially within the collar at different times and can be used during operation of the vehicle: a passive suspension system, a semi-active suspension system, and an active suspension system.

16. The method of claim 15, further comprising:
filling the female common space envelope with a passive suspension system, a semi-active suspension system, or an active suspension system depending on one or more mission payload considerations.

17. The method of claim 16, where the creating allows the passive, semi-active, or active suspension system to be replaced with a different suspension system that fits within the female common space envelope after one or more mission payload considerations change.

18. The method of claim 16, further comprising:
providing a common control system configured to control (a) an actuator of the semi-active suspension system when the semi-active suspension system is used, and (b) an actuator of the active suspension system when the active suspension system is used.

* * * * *